(12) United States Patent
Holtorf et al.

(10) Patent No.: US 9,738,387 B2
(45) Date of Patent: Aug. 22, 2017

(54) GALLEY SEGMENT FOR A CABIN OF A VEHICLE, CABIN OF A VEHICLE AND AIRCRAFT HAVING A CABIN WITH SUCH A GALLEY SEGMENT

(71) Applicant: Airbus Operations GmbH, Hamburg (DE)

(72) Inventors: Boris Holtorf, Hamburg (DE); Rodrigo Espinoza, Hamburg (DE)

(73) Assignee: Airbus Operations GmbH (DE)

( * ) Notice: Subject to any disclaimer, the term of this patent is extended or adjusted under 35 U.S.C. 154(b) by 200 days.

(21) Appl. No.: 14/696,816

(22) Filed: Apr. 27, 2015

(65) Prior Publication Data

US 2015/0314872 A1    Nov. 5, 2015

(30) Foreign Application Priority Data

Apr. 30, 2014  (EP) .................................. 14166716

(51) Int. Cl.
  *B64D 11/00* (2006.01)
  *B64D 11/04* (2006.01)
(52) U.S. Cl.
  CPC .......... *B64D 11/04* (2013.01); *B64D 11/0007* (2013.01)
(58) Field of Classification Search
  CPC ................ B64D 11/04; B64D 11/0007; B64D 2011/0046; B64D 11/0023
  See application file for complete search history.

(56) References Cited

U.S. PATENT DOCUMENTS

| 4,993,666 A | 2/1991 | Baymak et al. |
| 5,727,654 A * | 3/1998 | Roessner ............... A47J 39/006 |
| | | 186/40 |
| 8,469,311 B2 | 6/2013 | Saint-Jalmes et al. |

(Continued)

FOREIGN PATENT DOCUMENTS

| DE | 37 90 556 C1 | 10/1996 |
| DE | 10 2007 009 278 A1 | 8/2008 |

(Continued)

OTHER PUBLICATIONS

German Search Report dated May 16, 2014.
Inernational Search Report dated Oct. 14, 2014.
Extended European Search Report dated Nov. 12, 2014.

*Primary Examiner* — Assres H Woldemaryam
(74) *Attorney, Agent, or Firm* — Lerner, David, Littenberg, Krumholz & Mentlik, LLP

(57) ABSTRACT

A compact galley segment, which allows to safely and temporarily fix trolleys outside of a closed storage space includes a first trolley storage space, a second trolley storage space, a retractable trolley restraint device and a plurality of vertically arranged walls. The first trolley storage space includes a plurality of delimiting walls defining an inner space for receiving at least one trolley and an opening for inserting or removing the at least one trolley into or from the inner space. The second trolley storage space includes at least one placement space for temporarily placing a trolley. The trolley restraint device is integrated into or onto at least one of the plurality of vertically arranged walls and is configured for releasably restraining a trolley temporarily positioned in the second trolley storage space and for being fully retractable into the outer contour of the galley segment.

14 Claims, 8 Drawing Sheets

(56) References Cited

U.S. PATENT DOCUMENTS

| | | | |
|---|---|---|---|
| 8,544,795 B2 | 10/2013 | Guering et al. | |
| 8,672,267 B2 | 3/2014 | Schliwa et al. | |
| 2006/0243850 A1* | 11/2006 | Hartmann | B60P 7/08 242/529 |
| 2007/0228216 A1* | 10/2007 | Wenstrom | B64D 11/04 244/118.5 |
| 2008/0116773 A1* | 5/2008 | Van Loon | A47B 31/00 312/198 |
| 2008/0136299 A1* | 6/2008 | Peurifoy | B64D 11/04 312/237 |
| 2011/0114788 A1 | 5/2011 | Mosler et al. | |
| 2012/0325960 A1* | 12/2012 | Saint-Jalmes | B64D 11/00 244/118.1 |
| 2013/0206904 A1* | 8/2013 | Gee | B64D 11/02 244/118.5 |
| 2013/0206905 A1* | 8/2013 | Savian | B64D 11/003 244/118.5 |
| 2014/0359934 A1 | 12/2014 | Schliwa et al. | |

FOREIGN PATENT DOCUMENTS

| | | | | |
|---|---|---|---|---|
| DE | 10 2007 029 677 A1 | 1/2009 | | |
| DE | 10 2008 031021 A1 | 1/2010 | | |
| DE | 10 2010 013 330 A1 | 10/2011 | | |
| DE | 102011016031 A1 * | 10/2012 | ............ | B64D 11/00 |
| DE | 10 2011 122 061 A1 | 6/2013 | | |
| DE | 10 2012 003 713 A1 | 8/2013 | | |
| DE | 10 2013 108 121 A1 | 2/2015 | | |
| EP | 1 174 340 A2 | 1/2002 | | |
| FR | 2 917 376 A1 | 12/2008 | | |
| FR | 2 929 244 A1 | 10/2009 | | |
| FR | 2 954 276 A1 | 6/2011 | | |
| GB | WO 2012069797 A1 * | 5/2012 | ........... | A45C 13/36 |
| JP | H10 157566 A | 6/1998 | | |
| WO | 01/30639 A1 | 5/2001 | | |
| WO | 2008/070835 A1 | 6/2008 | | |
| WO | 2011/101385 A2 | 8/2011 | | |
| WO | WO 2012040564 A2 * | 3/2012 | .......... | A47B 96/025 |
| WO | 2015014850 A1 | 2/2015 | | |

* cited by examiner

GALLEY SEGMENT FOR A CABIN OF A VEHICLE, CABIN OF A VEHICLE AND AIRCRAFT HAVING A CABIN WITH SUCH A GALLEY SEGMENT

TECHNICAL FIELD

The invention relates to a galley segment for a cabin of a vehicle, to a cabin of a vehicle and an aircraft having a cabin with such a galley segment.

BACKGROUND OF THE INVENTION

Commercial aircraft, in particular for long-haul flights, tend to include an increasing catering volume, which is usually provided through trolley storage spaces and other storage compartments. In conjunction with the usual requirement to maintain a certain compactness inside the cabin for increasing the available number of passenger seats, some galleys provide trolley storage spaces, in which a plurality of trolleys are insertable through the same opening. Consequently, it may be necessary to remove one trolley from the storage space in order to reach another trolley positioned further inside the trolley storage space. During flight this leads to the necessity to temporarily fix or restrain the trolley that has been removed from the storage space for reaching the other trolley, thereby preventing an inadvertent movement of the trolley.

For the purpose of restraining the motion of a trolley inside a cabin, it is known to use a restrain belt, which may be pulled out of a dedicated compartment, to wrap it around the trolley to be fixed and to tighten the belt by pulling a strap on an outer end of the belt. However, using such a belt results in an excess length to protrude out of the galley, or to require a certain storage compartment only for stowing the belt when it is not in use.

Another solution is proposed in patent application DE 10 2013 108 121, which shows a partition wall opposite to a galley having a restraint device based on a flap, which may be swivelled onto the top of a trolley and to secure it in this position.

BRIEF SUMMARY OF THE INVENTION

An aspect of the invention may provide a galley segment having a trolley restraint device, which allows an as compact as possible design of the galley segment without requiring a certain stowage compartment for being able to store the restraint device when it is not in use.

A galley segment is proposed, the galley segment comprising a first trolley storage space, a second trolley storage space, a retractable trolley restraint device and a plurality of vertically arranged walls. The first trolley storage space comprises a plurality of delimiting walls defining an inner space for receiving at least one trolley and an opening for inserting or removing the at least one trolley into or from the inner space. The second trolley storage space comprises at least one placement space for temporarily accommodating a trolley. The trolley restraint device is integrated into or onto at least one of the plurality of vertically arranged walls and is configured for releasably restraining a trolley temporarily positioned in the second trolley storage space and for being fully retractable into the outer contour of the galley segment.

The first trolley storage space is able to receive one or more trolleys, for example two trolleys, wherein one trolley is positioned behind the other in relation to the opening. Such a trolley space allows to compact the galley segment in that the width of the galley segment can be reduced without sacrificing the number of trolleys to be inserted. However, as explained in the background of the invention, temporarily fixing one of the trolleys from the first trolley storage space in the second trolley storage space is necessary.

For this purpose, the second trolley storage space comprises the at least one placement space, that allows to position a trolley in a predetermined precise geometrical relationship to the galley segment. The fixation of the trolley is then conducted by a trolley restraint device, which is not positioned in or attached to a dedicated storage compartment, but instead at or in a vertically arranged wall of the galley segment.

Such a wall is to be understood as an integral component of the galley segment and may include outer/lateral walls or intermediate/partition/segmentation walls for separating two trolley storage spaces from each other or similar.

The expression "integrated into" is to be understood as positioning the restraint device completely inside the respective vertically arranged wall, such that it does not extend over outer contours of the respective wall. The expression "arranged onto" stands for arranging the restraint device on the particular wall, where it does not obstruct the inner space of a first trolley storage space and where it does not extend over the outer contour of the galley segment, i.e. over an edge that reaches the outer contour.

The galley segment having such a restraint device comprises several advantages over known restraint devices. First of all, a compact design is supported, which makes it possible to use the restraint device on positions in front or behind a trolley storage space, thereby optionally requiring small cut-outs in respective adjacent walls of the respective trolley storage space. Still further, the restraint device may be usable or adapted to be usable for all kinds of trolleys, in particular half size and full size trolleys without modification or additional parts on the trolley.

Altogether, the galley segment according to an embodiment of the invention has clear benefits over known galley segments with restraint devices and is a leap forward to even more compact galleys without sacrificing the provided storage volume and thereby supporting the integration of more passenger seats or providing a larger available space for each passenger.

In an advantageous embodiment, the trolley restraint device comprises a fully retractable belt having an overlength, a first connecting means at a free end of the belt, a second connecting means separate from the belt, attachable to a fixed point in the cabin and engageable with the first connecting means for receiving the first connecting means and a winding mechanism for providing a pulling force on the belt. The belt being a flexible, strap-like element allows to easily fix a trolley by wrapping the belt around at least a part of the respective trolley and engaging the first connecting means located on the belt with a second connecting means separate from the belt and, exemplarily, located at a structurally fixed point of the galley segment. Due to the overlength, which stands for an excess length of the belt, about which the belt exceeds a necessary length for being wrapped around the trolley, a user may easily be able to pull out the belt and engage the two fixing means. Also, providing the overlength leads to the ability to eliminate the strap on the free end of the belt, which has to be tightened by the user and which is permanently present outside the galley segment. For the sake of clarity, the winding mechanism provides a pulling force that constantly urges the belt back into a neutral, fully retracted position, thereby allowing to easily retract the belt when the first and the second connecting means are disengaged and when the overlength is pulled out. Consequently, the trolley restraint device will remove the overlength after the two fixing means are engaged and when the belt is released by the user. However, this is independent from a locking/latching function of the belt, which is integratable into the trolley restraint device so as to absorb much greater mass forces and further explained below.

The first connecting means may exemplarily be realized as a buckle, while the second connecting means is an engageable counterpart, such as a snap-hook. However, other means may be usable, which in particular are able for providing a positive connection.

In a preferred embodiment of such a trolley restraint device, an inner end of the belt comprises a sliding means, which is slidably supported on the respective wall, wherein the sliding means is coupled with a pulling means, which urges the sliding means into a neutral position with a fully retracted belt. The pulling means hereby constitutes the winding mechanism and may be realized through a broad variety of different devices, which may active or passive devices. The inner end is to be understood as the end of the belt that is directly coupled with the winding mechanism and which does not extend over the trolley restraint device.

In an advantageous embodiment, the pulling means is a passive means, in particular a linear rubber element, which at one end is coupled with the sliding means and at another end is coupled with the respective wall or another structurally fixed component inside the galley segment. The use of such a passive element leads to a distinctly low weight of the winding mechanism and, at the same time, allows an operation independent from electrical energy. The installation space provided to the winding mechanism may be rather flat and comprise merely two distinct directions of extension defined by the particular wall of the galley segment. For increasing the compactness of the galley segment, a third direction of extension of the winding mechanism is to be kept as small as possible. However, due to the distinctly large surface area available to the winding mechanism, it is easily possible to wind such a passive pulling means in a zigzag manner in the installation space to increase the available length, wherein through the use of rollers, a pulley effect is achievable for increasing the effective pulling force on the belt. At the same time, the available length of the belt, which may be pulled out of the galley segment and to be retracted into the galley segment again, is adjustable. Besides linear rubber elements other elastic elements are usable, such as extension springs.

Advantageously, the sliding means comprises a locking recess. The trolley restraint device comprises a locking device having a shape corresponding to the locking recess and arranged in an intermediate position that is directly adjacent to the locking recess in the sliding means, when an overlength of the belt is pulled out allowing to engage or disengage the trolley restraint device.

In a preferred embodiment, the sliding means comprises a front side, and the locking device is adapted for snapping into place in front of the front side of the sliding means in a locking position, when the sliding means is pushed by means of a tightening element into the housing for removing an overlength of the belt for tightening the belt around a trolley. The sliding means and the locking device thereby provide a latching mechanism, which is able to secure the sliding means in the locking position, in order to prevent pulling out the belt further than required in a tightened position. The locking device may thereby also be named a slide lock.

Preferably, the locking device and the locking recess are adapted for self-locking with the sliding means moving into an inward direction of the galley segment. This may be conducted by adapting the locking device so as to be movable towards and away from the locking recess of the sliding means in the locking position and to automatically snap into place once the locking device and the locking recess align with each other. Also preferably, the locking device may be adapted for blocking the movement of the sliding means in a belt release direction, i.e. the direction of the belt being pulled out of the galley segment, and for allowing the sliding means movement in a tightening direction.

For improving the self-locking function the locking device may comprise a spring mechanism, which is adapted for permanently urging the locking device to the sliding means. At least one of the locking device and the sliding means should then comprise a means for guiding the locking device into the locking recess when the sliding means moves in an inward direction, such as a link, an inclined, ramp-like surface or the such.

In a still further advantageous embodiment, the trolley restraint device comprises a delocking means, which is configured for disengaging the locking device and the locking recess through moving the delocking means. For example, the delocking means may comprise a tapered, ramp-like surface at an internal end, which is movable parallel to the movement direction of the sliding means towards the locking pin, which in turn comprises an engagement means, such as a sliding pin, sliding on the ramp-like surface. Through the tapered surface the sliding pin slides on the surface and follows its ramp angle. With the tapered surface being inclined away from the locking recess, the engagement means thereby conducts a motion away, i.e. out of, the recess. However, it is clear that also a number of other variants are possible and not limiting the invention to such a ramp-like surface. However, it should comprise an operating side, which is easily accessible from in front of the galley segment. The delocking means is useful for untightening and removing the belt for setting free the trolley again.

In another advantageous embodiment, the belt comprises an overlength section having an optical warning means, wherein the overlength section is positioned in an area of the belt that does not protrude outside the galley segment when the belt is tightened around a trolley. A user is thereby made aware of the fact that the belt is not tightened yet, if the optical warning means is visible, and that it is not safe to leave the trolley alone. The optical warning means may be realized through a wide variety of different means, for example a text printed on the belt, a warning colour, such as bright red or orange, or by printing a placard on this belt section. The idea is to allow the user to easily identify that the tightening process is finished.

In a further advantageous embodiment, the trolley restraint device comprises at least one dimensionally stable holding means stowable in or on at least one wall of the plurality of walls of the galley segment. The holding means are configured so as to be movable from a stowed position into a use position, wherein in the use position the holding panels at least abut a side surface of the trolley to be fixed. The idea behind the holding means is to provide more rigid devices that allow to firmly hold the trolley in the second trolley storage space by providing a positive connection to at least one side of the trolley. The movement of the trolley is thereby restraint through the at least one holding means and preferably a surface or an object, against which the trolley may abut.

In this regards, the holding means may be realized by a plurality of different elements, which include linear holding means or surface-like holding means. The at least one holding means may be a multi-part component, wherein at least two parts are coupled by means of a joint, which not only allows to let the holding means extend along a side surface of the respective trolley to be held, but may be at least partially wrapped around a corner of the trolley and extend along at least a part of the subsequent side surface of the trolley. The available length of the respective wall in the galley segment allows to easily receive the at least one holding means in a fully retracted state.

However, also the use of a plurality of holding means is conceivable for at least partially enveloping/wrapping the trolley in the second trolley storage space, while the fixation by means of the above-mentioned belt may even be used in combination thereto.

Using a holding means may particularly be useful if the galley segment according to the invention is located in the direct vicinity of another monument, a door having a protruding slide or raft container, etc. The holding means may be brought into a position that separates the second trolley storage space from the other monument or the door, thereby supporting another geometrical constraint that allows an abutment of the trolley.

Still further, the trolley restraint device may comprise at least one retractable vertical holding means, which may be brought into a position protruding from the galley segment and reaching directly above the respective trolley to be held in position. The at least one vertical holding means may therefore be arranged in a position corresponding to the height of a common trolley, such as in or at an upper delimiting surface of a trolley storage space slightly above the trolley height. For example, vertical holding means in form of latches, hooks, belts and bars may be used.

The galley segment may also comprise at least one retractable or removable protector for protecting a retainer front side, which protector may be brought into place between a trolley to be held and the retainers/latches of a trolley in a directly adjacent trolley storage space. This protector is to be understood as a component that prevents the trolley to be held to touch the trolley to be protected, which would otherwise lead to rattling and destroyance of knobs or locking bolts of the trolley to be protected. The protector may be a distancing element made from a rigid or soft material that prevents the direct alignment of the trolley to be held with any other surface behind it. This could be realized by rubstrips or additional devices between the trolley back wall and the latch front face plane. In case of doors or walls behind the trolley only bumpers or rubstrips are on these surfaces may be necessary.

Preferably, the protector is mechanically coupled with the trolley restraint device for being automatically activated once the trolley restrained device is used.

For the sake of completeness it is indicated that the trolley restraint device may not only be arranged in front of a galley, but also at a back side, in particular on a galley that is positioned freely in the middle of a cabin. For this purpose, the trolley restraint device, be it comprising belts, holding means or any other suitable devices, may be pulled out of the galley segment through openings in the delimiting walls of the galley.

It is further indicated that the trolley restraint device, i.e. the holding means or the belt, are preferably arranged in a position close the center of gravity of a trolley to be fixed, be it a half size trolley or a full size trolled. Vertical holding means do not need to comprise the same length as a full trolley. The extension and retraction movement of all elements, be it holding means or vertical holding means, may be conducted through rotation or (longitudinal) translation.

It may be beneficial to provide a simple override system in case stiff holding means of the galley assembly block and protrude into an evacuation path or an assist space.

The invention also relates to a cabin of a vehicle, comprising a floor with a plurality of passenger seats mounted thereon, and at least one galley having a galley segment as discussed above. In this context it is not relevant whether the galley faces to the rear or the front of the cabin and whether it comprises a through-opening for allowing to pass through the galley from one side of the cabin to another side.

Still further, the invention also relates to an aircraft having such a cabin with such a galley segment.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIGS. 1 to 5c show trolleys and galley components from underneath the galley (bottom view) for the purpose of clarification.

DETAILED DESCRIPTION

Figure 1:
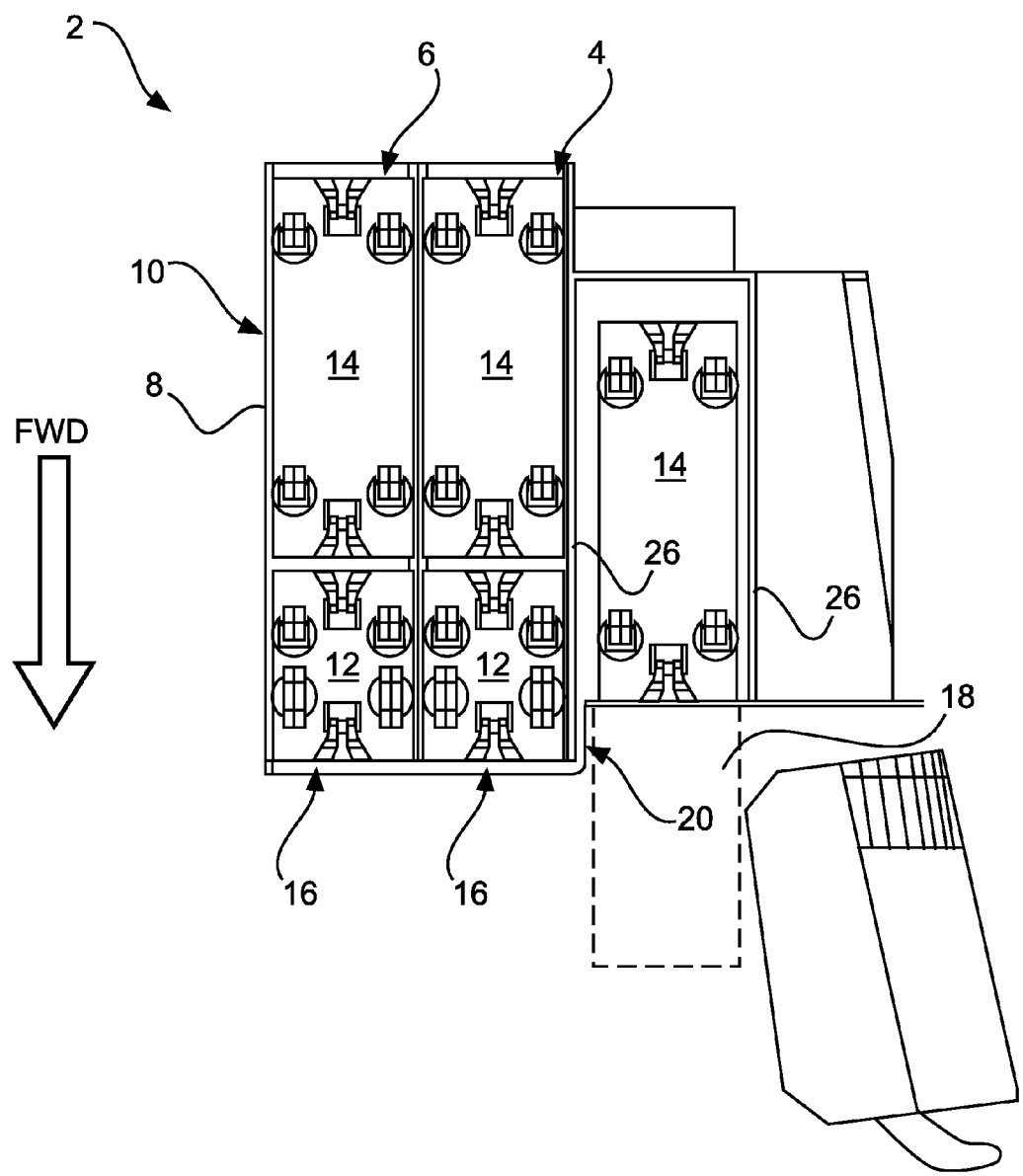
FIG. 1 shows a galley segment with a plurality of trolleys in first storage spaces in a sectional top view.

FIG. 1 shows a first exemplary embodiment of a galley segment 2, which comprises first trolley storage spaces 4 and 6, which comprise a housing 8 defining an inner space 10 each. The first trolley storage spaces 4 and 6 are adapted for securely receiving trolleys 12 and 14 when they are not needed in the cabin.

As demonstrated, different kinds of trolleys may be used. For example, trolley 12 may be a so-called half size trolley, while trolley 14 is a so-called full size trolley. In such a compact galley, from which galley segment 2 is a part, different trolleys may be inserted one behind the other in a single trolley storage space 4, 6.

The first trolley storage spaces 4 and 6 each comprise an opening 16, through which the trolleys 12 and 14 may be inserted into the inner space 10. The housing 8 comprises a depth that exceeds the length of a full size trolley 14, such that a half size trolley 12 may be positioned in front of a full size trolley 14. Consequently, if access to a full size trolley 14 is desired, the half size trolley 12 in front of it has to be removed and temporarily parked elsewhere.

Figure 2:
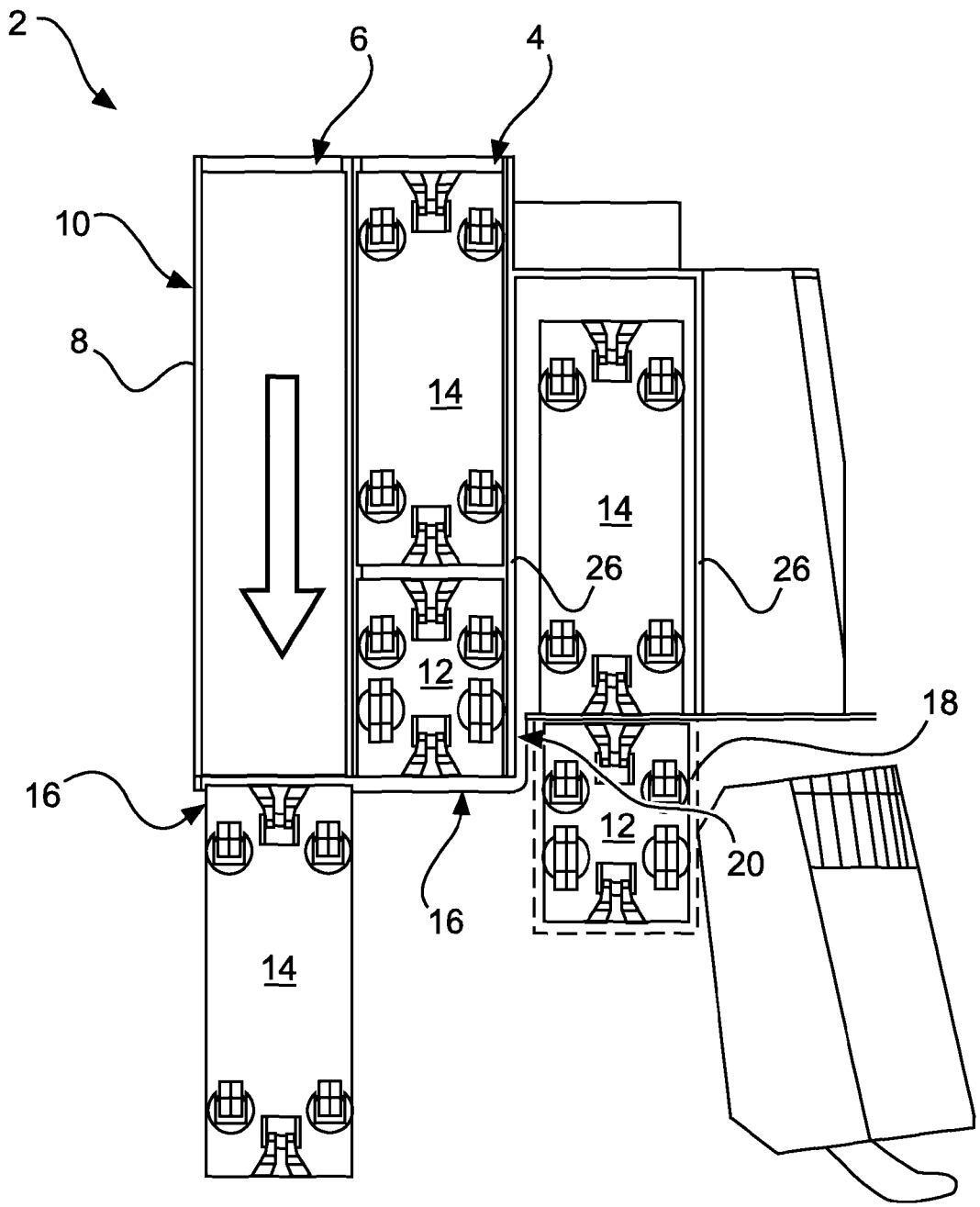
FIG. 2 shows the galley segment with a trolley in a second trolley storage space.

This is shown in FIG. 2, where the left half size trolley 12 is taken out of the first storage space 6 and parked at a second trolley storage space 18, which may comprise a geometrical constraint 20 in form of an edge, a corner, a surface, another holder, a trolley retainer, a distance element or any other means, against which the trolley 12 may abut. Resultantly, the full size trolley 14 may be removed from the first trolley storage space 6 as indicated by the arrow.

However, in this exposed position outside any first trolley storage space 4, 6, the trolley 12 has to be secured in the second trolley storage space 18 in order to prevent it from moving relative to the galley segment 2 during flight of the aircraft. For this purpose, a plurality of different trolley restraint devices may be used, which are shown hereinafter.

Figure 3:
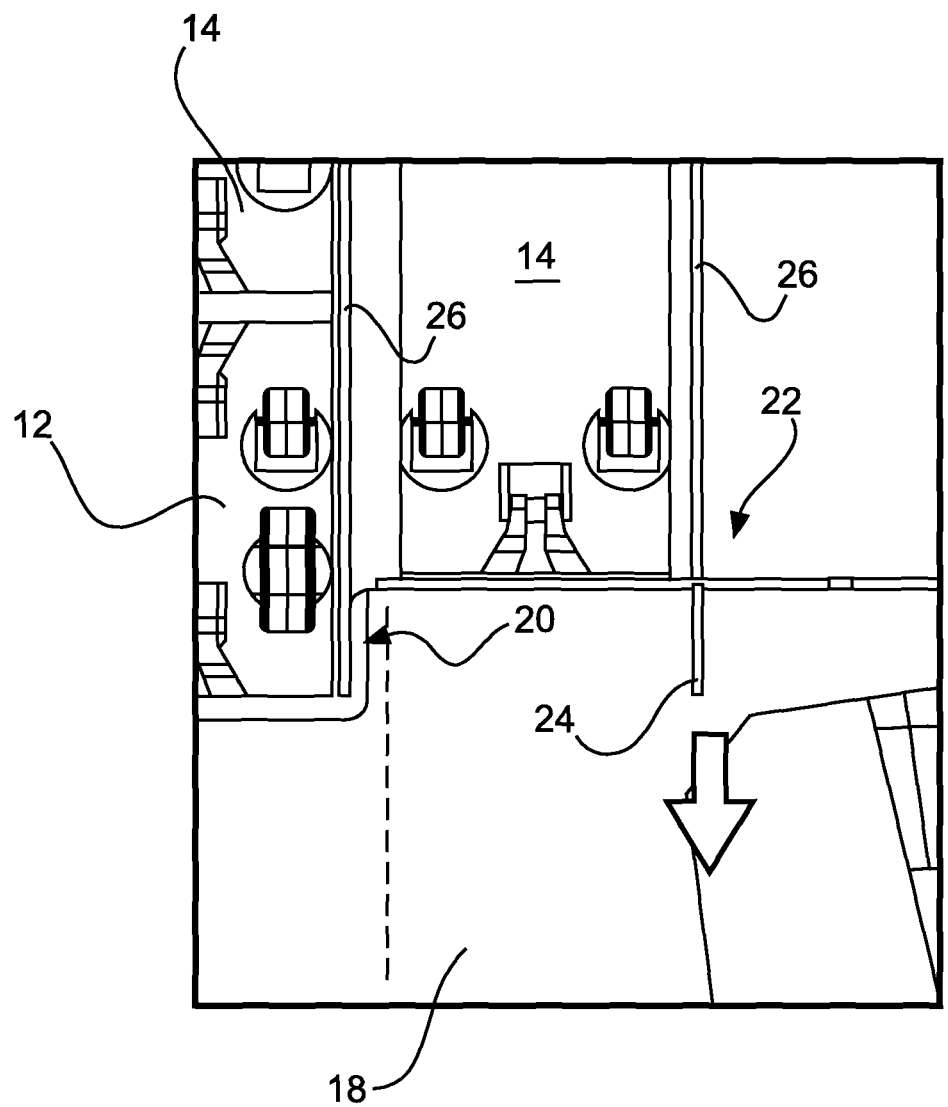
FIG. 3 shows the galley segment with a holding means being pulled out of a wall of the galley segment.

For example, FIG. 3 shows a trolley restraint device 22, which comprises a holding means 24, which is retractably supported in a wall 26 of the galley segment 2. The holding means 24 is a dimensionally stable mechanical linear or surface-like component, which is able to define appropriate mechanical delimitations, i.e. stops, for the trolley 12 to be fixed.

For securing the position of the trolley 12, it must be moved to the second trolley storage space, after which the holding means 24 is pulled out of the wall 26, wherein the wall 26 is at a distance to another geometrical constraint 20, which together with the holding means 24 defines a lateral delimitation of the trolley storage space 18, which prevents the trolley from lateral motion.

As an alternative to the integration into the wall 6, the holding means 24 may also be supported on a surface of the wall 26, for example through a set of guide rails or the such mounted to the surface of the wall 26. It should be considered an as flat as possible set of guides for guiding the holding means in order to hardly increase the dimensions of the trolley storage spaces 4, 6.

Figure 4A:
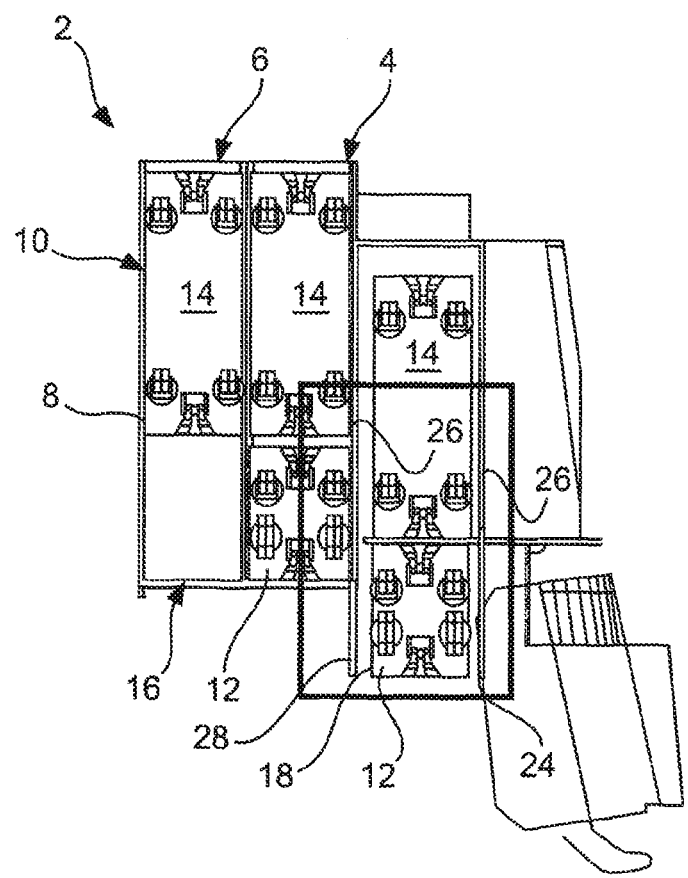
FIGS. 4a and 4b show the galley segment with a plurality of different holding means.
Figure 4B:
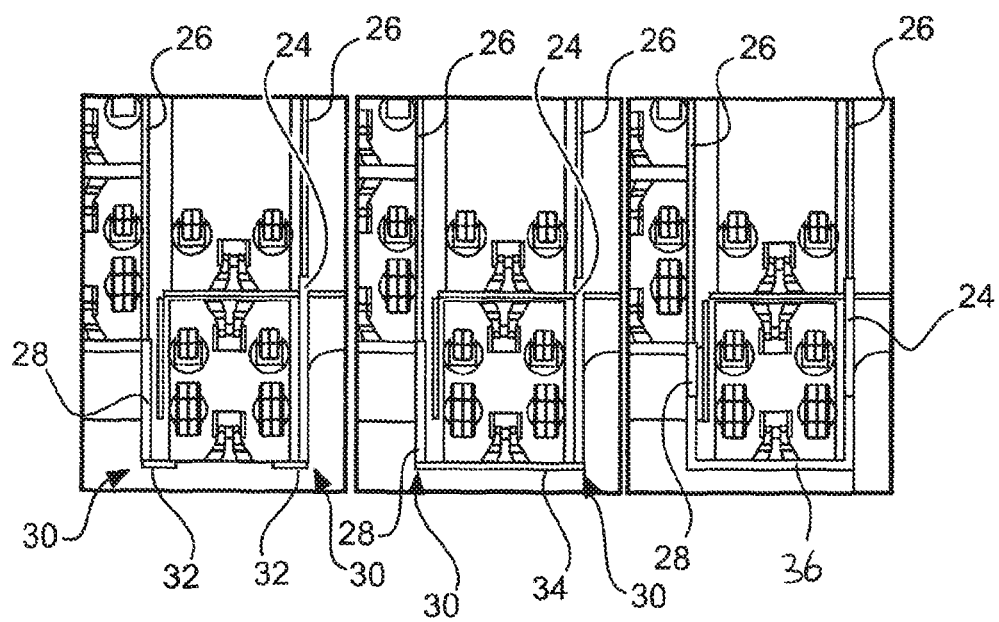

However, the holding means 24 is just one part of the exemplary trolley restraint device 22, which may include further holding means 28 shown in FIGS. 4a and 4b. Here, a holding means 28 directly joins a corner 21, adjacent to which a trolley 12 is placed. It may also be conceivable to provide such a holding means 28 without such a corner 20. It may be beneficial to provide two parallel delimiting surfaces, between which the trolley 12 to be fixed is positionable.

Still further, FIG. 4b shows additional holding means 32 at ends 30 of the holding means 24 facing away from sidewall 26 and the corner 21, which additional holding means 32 provide a positive connection with the trolley 12. Alternatively to providing two additional holding means 32 also a single, linear holding means 34 is suitable, which completely extends between the ends 30. However, a multi bent additional holding means 36 connecting both holding means 24 and 28 may be installed. All multi-part holding means arrangements may be realized through providing joints between the individual holding means 24, 28 and 32, 34 or 36.

Figures 5A, 5B, 5C:
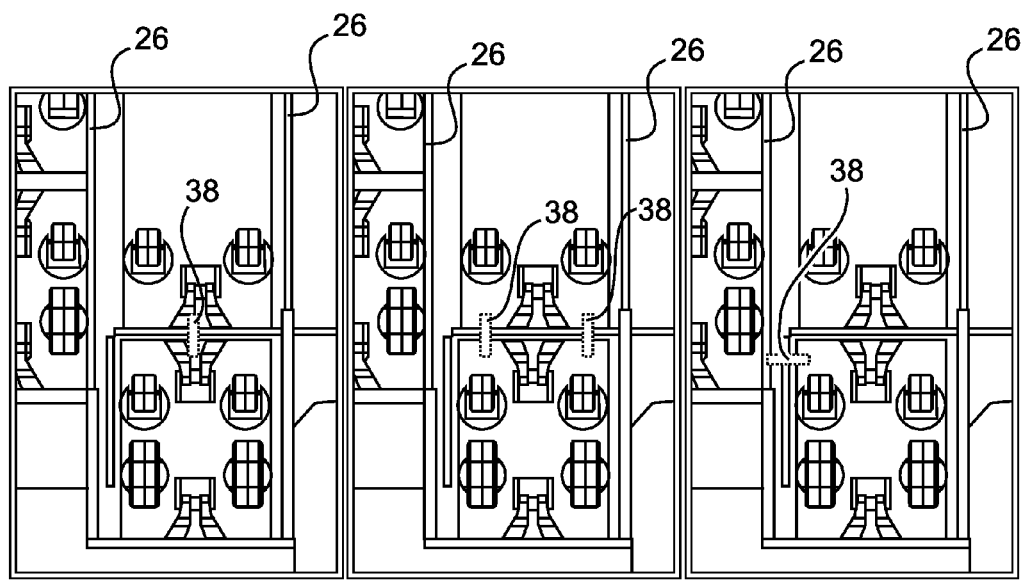
FIGS. 5a, 5b, and 5c show vertical holding means.

As depicted in FIGS. 5a, 5b and 5c, further retractable vertical holding means 38 (dashed) may be installed in the galley segment for limiting the freedom of trolley movement in a z-direction, which is vertical to the cabin floor, which prevents the trolley 12 from being lifted by vertical mass forces during turbulences. In FIG. 5a a single vertical holding means 38 is arranged at a boundary surface between the galley segment 2 and the trolley 12. FIG. 5b shows a more reliable arrangement of two vertical holding means 38 and FIG. 5c depicts a vertical holding means arranged at a protruding structure part.

Figure 6A:
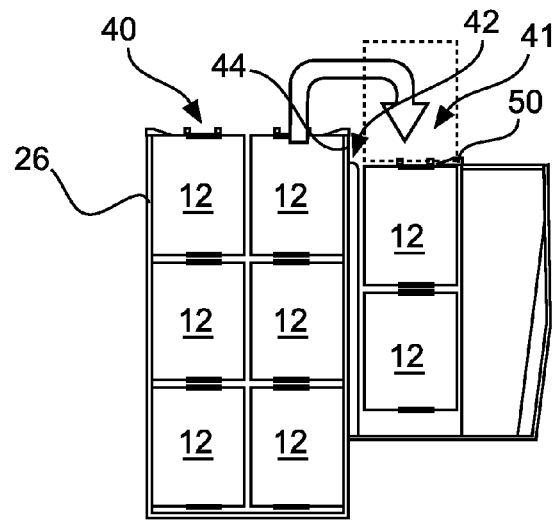
FIGS. 6a, 6b, and 6c show a trolley being fixed with a trolley restraint device having a belt.
Figure 6B:
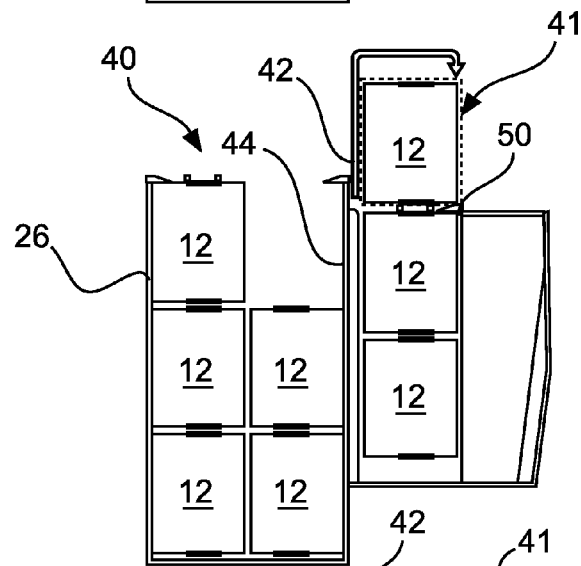
Figure 6C:
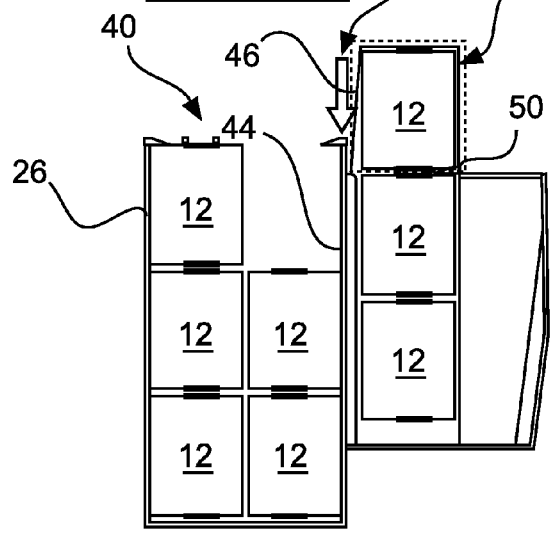

In FIGS. 6a, 6b and 6c, a sequence of moving and securing a half size trolley 12 in another galley segment 40 on a second trolley storage space 41 is shown. The galley segment 40 comprises a trolley restraint device 42, which rests flush against a sidewall 44 and which comprises a belt 46, which may be wrapped around the respective trolley 12 to be fixed and having a first connecting means 56, which is to be engaged with a second connecting means 50 attached to a structurally fixed point of the galley segment 40.

Figure 7A:
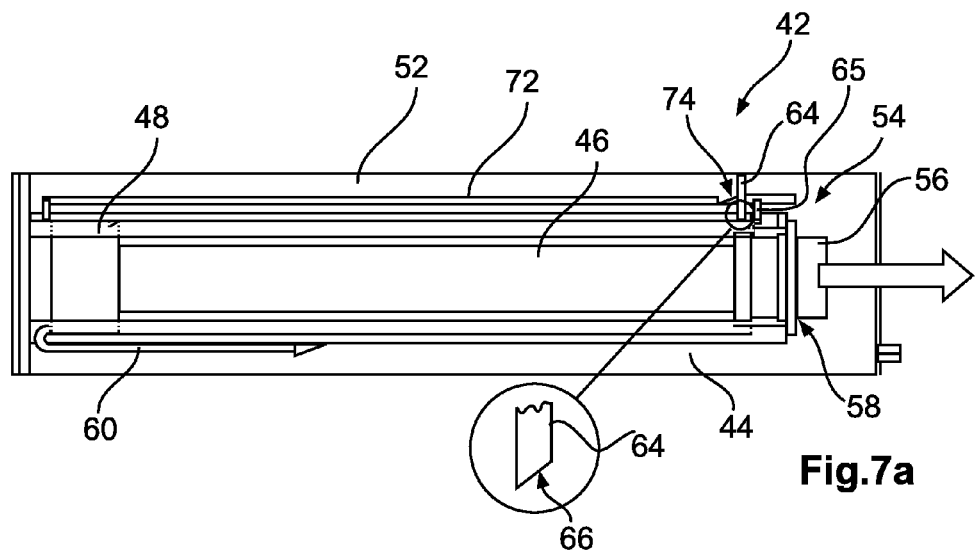
FIGS. 7a, 7b, and 7c show details of the trolley restraint device having a belt.
Figure 7B:
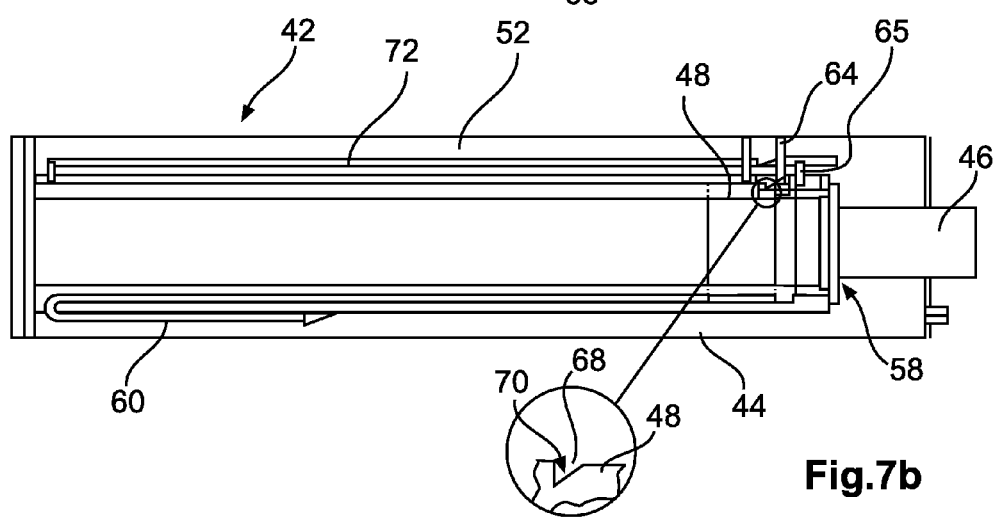
Figure 7C:
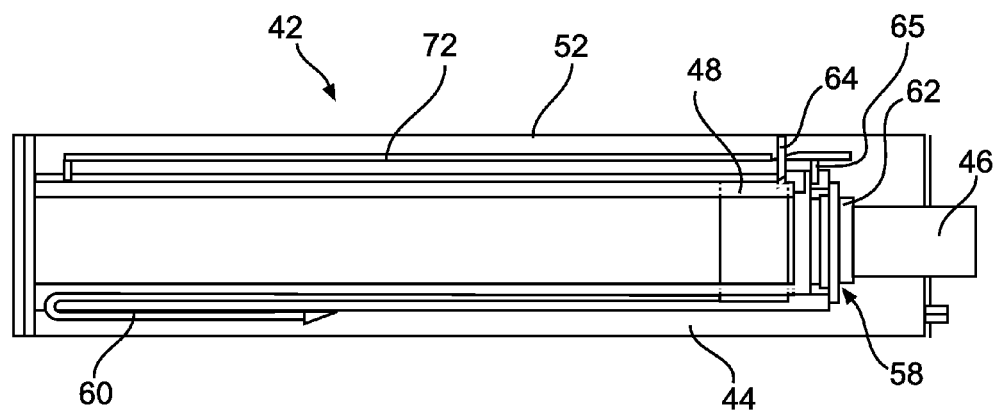

The functional principle of the trolley restraint device 42 is explained referring to FIGS. 7a to 7c. The belt 46 is coupled with a sliding means 48, which is slidably supported in guides attached or integrated into a housing 52 of the restraint device 42. An end 54 of the belt 46 opposite to the sliding device 44 comprises a first connecting means in form of a buckle 56, which is configured to be engageable with the corresponding second connecting means 50 located at another structural point of the galley segment 40.

FIG. 7a shows the belt 46 in a completely retracted position, with the buckle 56 resting at an inmost position. By pulling out the buckle 56, as shown in FIGS. 7b and 7c, the sliding means 48 is pulled into the direction of an opening 58 of the housing 52. Hereby, a pulling means 60 is tensioned, which in turn urges sliding means 48 back into a neutral position opposite the opening 58. The pulling means 60 may be realized as a passive pulling means, e.g. through a rubber band or another linear element which provides a spring force. This allows a very flat, lightweight and compact arrangement while at the same time obviating the need of electrically driven devices.

In order to tighten the belt 46 around a trolley it is necessary to pull the belt 46 out of the opening 58 exemplarily until the sliding means 48 comes to a stop, to engage the buckle 56 with the respective second connecting means 50 and afterwards to release and tighten the belt 46. FIG. 7c shows a status with the maximum length of the belt 46 being pulled out of the housing 52. In this state, a tightening element 62, which is slidably supported in the vicinity of the opening 58, is pushed by the sliding means 48 towards the opening and consequently protrudes out of the opening 58 and blocks. The extended length of the belt 46 exceeds the necessary length for the trolley 12 to be fixed, which excess length being named overlength in the context of this application. However, this allows a user to simply engage the buckle 56 with the second connecting means 50. As an indication, an optical warning means 63 is used, which is only visible when the overlength is used. The optical warning function may be accomplished through using a bright (warning) color layer 63 on the tightening element 62, such as bright orange.

Hence, the user is aware that for a proper function of the restraint device 42 the overlength should be inside the housing 52. The pulling means 60, especially a passive one, may not be strong enough to pull the sliding means 48 completely back into a tightened position. However, this may be accomplished by manually pressing the protruding tightening element 62 into the housing 52, such that the sliding means 48 locks inside the housing 52. The overlength disappears, the belt 46 is locked and the trolley 12 is fixed.

As indicated in FIG. 7c, the sliding means 48 approaches an end stop to prevent the belt 46 and the sliding means 48 to be pulled out completely. In an area near this end stop a locking device 64, which is also named locking pin 64 in the following, is present. The locking pin 64 is movably supported in a direction perpendicular to the belt movement direction and, preferably, spring loaded to continuously urge to the sliding means 48. The locking pin 64 comprises an end face 66, which is inclined such that it partially faces the opening 58. The sliding means 48 comprises a locking recess 68 with an inclined face 70 facing away from the opening 58.

For completely moving out the belt 46, the locking device 64 must be moved to a distance from the sliding means 48, such that the sliding means 48 may move past the locking device 64. Then, the overlength may be pulled out of the housing 52 to allow the buckle 56 to be inserted into the appropriate second connecting means 50.

By releasing belt 46, the sliding means 48 is urged inwardly and moves along the locking device 64. During this motion, the sliding means 48 touches the inclined surface 66 of the locking device 64 and thereby pushes it laterally away. Once the locking device reaches the recess 68 of the sliding means, which happens in an intermediate position, in which a sufficient overlength is available for locking the buckle 56, it snaps into place in the locking recess 68. In this intermediate position, the overlength is only partially retracted into the housing 52 and, due to the inclinations of the end face 66 of the locking device 64 and of the face 70 in the locking recess 68, the sliding means 48 may only be moved further inwardly, but a motion further outwardly is blocked, leaving some overlength e.g. for releasing the buckle by pressing a delocking pin 72. Tightening and thereby completely removing the overlength is exemplarily only possible by pushing the tightening element 62. If this is done, the locking pin 64 is pushed upwardly through the inclined surface 66 gliding on the surface 70 of the recess 68. After the overlength is completely removed, the locking pin 64 reaches a front end of the tightening element 63 and snaps into the front of the tightening element, which corresponds to the locking position, in which it is impossible to move the belt further out or further in, when the buckle 56 is locked.

For the purpose of releasing the belt 46 and the trolley 12 that is fixed by the belt 46 again, a delocking pin 72 is provided, which extends to a region of the opening 58 and which is couplable with the locking device 64. When the sliding means 48 is pulled towards the opening, it may also touch a push pin 65 attached to the delocking pin 72, which is then extending further out. For example, the delocking pin 72 is movably supported in a direction parallel to the moving direction of the belt 46. A ramp-like surface 74 facing away from the locking device 64 may be brought into engagement with a movement means, such as a pin, which attached to the locking device 64. By moving the delocking 72 pin further inwardly, the movement means slides upwardly on the ramp-like surface 74 and thereby moves the locking device upwardly, i.e. away from the sliding means 48, and thereby disengages the locking device 64 and the front side of the sliding means 48. The sliding means 48 may be slightly pulled out of the housing 52 until the locking pin 64 snaps into the recess 68, which happens in the intermediate position, where the user may easily disengage buckle 56 from the second connecting means 50. Afterwards, the delocking pin 72 may be pressed once again to allow the locking pin 64 to leave the recess 68 and to allow to completely retract the belt 46 again.

Both trolley restraint devices 22 and 42 may be used in combination. Further, a plurality of trolley restraint devices 22 and 42 may be installed in a galley segment. To sum up, the galley segment of the present invention comprises a distinct compactness as well as lightweight means for temporarily fixing trolleys outside common trolley storage spaces.

Figure 8:
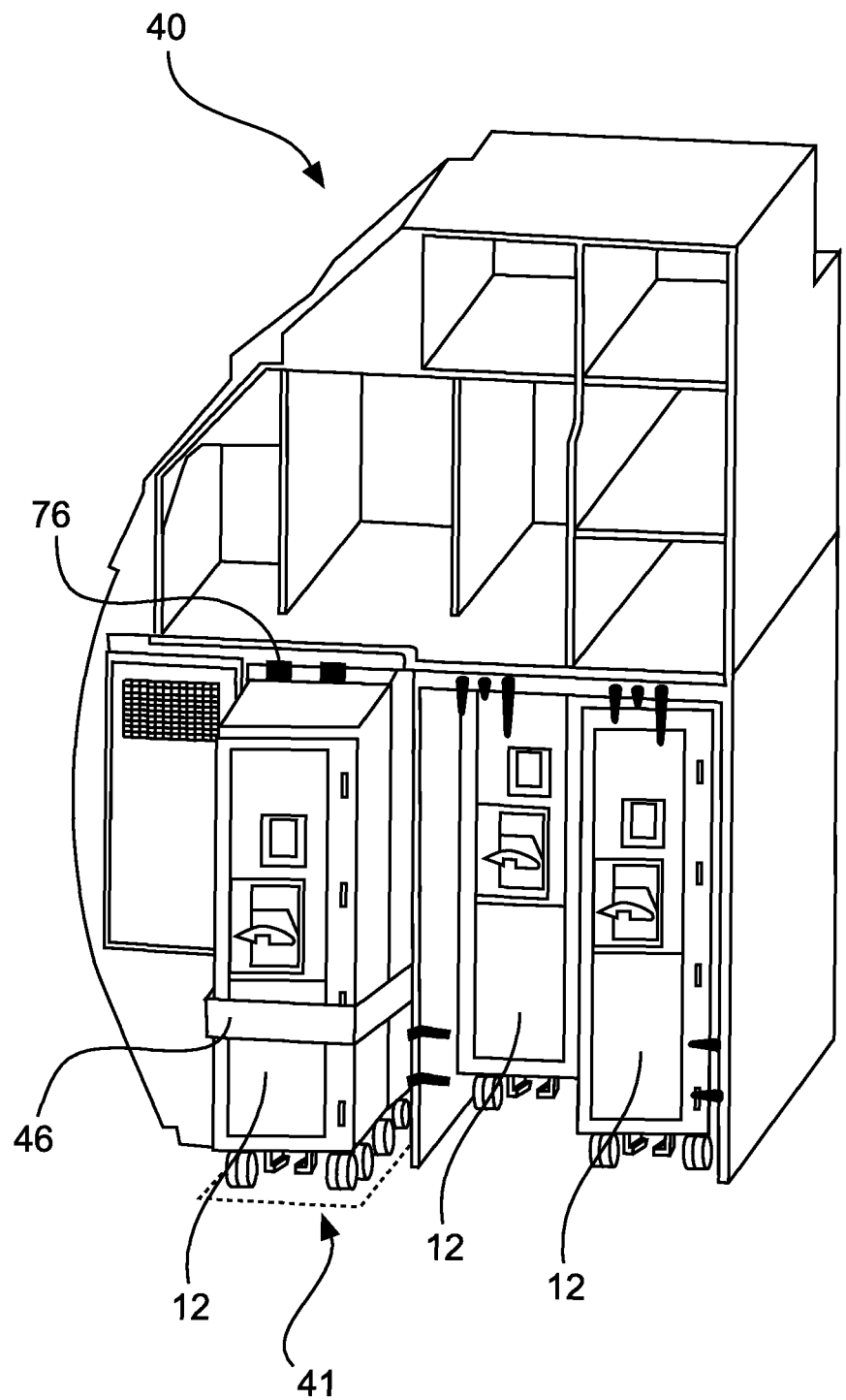
FIG. 8 shows a galley segment in a three-dimensional view.

Finally, FIG. 8 shows the galley segment 40 with a half size trolley 12 being tightened by means of a belt 46 on a second trolley storage space 41. The belt 46 is arranged in a vertical position substantially corresponding to the center of gravity of trolley 12. Protectors 76 are arranged between the trolley 12 and the trolley 12 behind it, in order to protect the trolley latches of the trolley retainer.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A galley segment, comprising:
a first trolley storage space;
a second trolley storage space;
a retractable trolley restraint device; and
a plurality of vertically arranged walls,
   wherein the first trolley storage space comprises a plurality of delimiting walls defining an inner space for receiving at least one trolley and an opening for inserting or removing the at least one trolley into or from the inner space,
   wherein the second trolley storage space comprises at least one placement space for temporarily placing a trolley,
   wherein the trolley restraint device is integrated into or onto at least one of the plurality of vertically arranged walls and is configured for releasably restraining a trolley temporarily positioned in the second trolley storage space and for being fully retractable into the outer contour of the galley segment, and
   wherein the trolley restraint device comprises:
   a fully retractable belt having an overlength:
   a first connecting means at a free end of the belt:
   a second connecting means separate from the belt, attachable to a fixed point in a cabin and engageable with the first connecting means for receiving the first connecting means: and
   a winding mechanism for providing a pulling force on the belt.

2. The galley segment of claim 1, wherein the trolley restraint device is lockable in a state when a trolley is restrained.

3. The galley segment of claim 1, wherein the winding mechanism comprises a sliding means and a pulling means,
wherein the sliding means is arranged at an inner end of the belt, which is slidably supported on the respective wall, and
wherein the sliding means is coupled with the pulling means, which urges the sliding means into a neutral position with a fully retracted belt.

4. The galley segment of claim 3, wherein the pulling means is a passive means, which at one end is coupled with the sliding means and at another end is coupled with the respective wall or another structurally fixed component inside the galley segment.

5. The galley segment of claim 3, wherein the sliding means comprises a locking recess, and
wherein the trolley restraint device comprises a locking device having a shape corresponding to the locking recess and arranged in an intermediate position that is directly adjacent to the locking recess in the sliding means, when an overlength of the belt is pulled out allowing to engage or disengage the trolley restraint device.

6. The galley segment of claim 3, wherein the sliding means comprises a front side, and
wherein the locking device is adapted for snapping into place in front of the front side of the sliding means in a locking position, when the sliding means is configured to be pushed by a tightening element into the housing for removing an overlength of the belt for tightening the belt around a trolley.

7. The galley segment of claim 1, wherein the trolley restraint device comprises a delocking means, which is configured for disengaging the locking device and a locking recess through moving the delocking means.

8. The galley segment of claim 1, wherein the trolley restraint device comprises at least one dimensionally stable holding means stowable in or on at least one wall of the plurality of walls of the galley segment.

9. The galley segment of claim 8, wherein the trolley restraint device comprises a plurality of holding means.

10. The galley segment of claim 1, wherein the trolley restraint device comprises at least one retractable vertical holding means, which is positionable into a position protruding from the galley segment and reaching directly above the respective trolley to be held in position.

11. The galley segment of claim 1, further comprising at least one retractable or removable protector for protecting a trolley front side,
which protector is positionable into place between a trolley to be held and a trolley in a directly adjacent trolley storage space.

12. The galley segment of claim 11, wherein the protector is mechanically coupled with the trolley restraint device for being automatically activated once the trolley restraint device is used.

13. A cabin of a vehicle, comprising a floor with a plurality of passenger seats mounted thereon, and at least one galley having a galley segment comprising:
a first trolley storage space;
a second trolley storage space;
a retractable trolley restraint device; and
a plurality of vertically arranged walls,
wherein the first trolley storage space comprises a plurality of delimiting walls defining an inner space for receiving at least one trolley and an opening for inserting or removing the at least one trolley into or from the inner space,
wherein the second trolley storage space comprises at least one placement space for temporarily placing a trolley,
wherein the trolley restraint device is integrated into or onto at least one of the plurality of vertically arranged walls and is configured for releasably restraining a trolley temporarily positioned in the second trolley storage space and for being fully retractable into the outer contour of the galley segment, and
wherein the trolley restraint device comprises:
a fully retractable belt having an overlength;
a first connecting means at a free end of the belt;
a second connecting means separate from the belt, attachable to a fixed point in the cabin and engageable with the first connecting means for receiving the first connecting means; and
a winding mechanism for providing a pulling force on the belt.

14. An aircraft comprising a cabin with at least one galley segment comprising:
a first trolley storage space;
a second trolley storage space;
a retractable trolley restraint device; and
a plurality of vertically arranged walls,
wherein the first trolley storage space comprises a plurality of delimiting walls defining an inner space for receiving at least one trolley and an opening for inserting or removing the at least one trolley into or from the inner space,
wherein the second trolley storage space comprises at least one placement space for temporarily placing a trolley,
wherein the trolley restraint device is integrated into or onto at least one of the plurality of vertically arranged walls and is configured for releasably restraining a trolley temporarily positioned in the second trolley storage space and for being fully retractable into the outer contour of the galley segment, and
wherein the trolley restraint device comprises:
a fully retractable belt having an overlength;
a first connecting means at a free end of the belt;
a second connecting means separate from the belt, attachable to a fixed point in the cabin and engageable with the first connecting means for receiving the first connecting means; and
a winding mechanism for providing a pulling force on the belt.

* * * * *